US008944101B2

(12) United States Patent
Pifer et al.

(10) Patent No.: US 8,944,101 B2
(45) Date of Patent: Feb. 3, 2015

(54) VALVE ASSEMBLY FOR HIGH-PRESSURE FLUID RESERVOIR

(71) Applicant: Eaton Corporation, Cleveland, OH (US)

(72) Inventors: Daniel Lee Pifer, Chelsea, MI (US); Vaughn Mills, Chelsea, MI (US); Ronald Sexton, South Lyon, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/043,157

(22) Filed: Oct. 1, 2013

(65) Prior Publication Data

US 2014/0041737 A1    Feb. 13, 2014

Related U.S. Application Data

(63) Continuation of application No. 13/011,676, filed on Jan. 21, 2011, now Pat. No. 8,573,255, and a continuation-in-part of application No. 12/749,924, filed on Mar. 30, 2010, now Pat. No. 8,584,704.

(60) Provisional application No. 61/171,548, filed on Apr. 22, 2009.

(51) Int. Cl.
*F02M 37/20*     (2006.01)
*F02M 33/00*     (2006.01)
(Continued)

(52) U.S. Cl.
CPC ...... *F02M 25/0836* (2013.01); *B60K 15/03519* (2013.01); *F16K 17/0413* (2013.01);
(Continued)

(58) Field of Classification Search
CPC ............... F16K 31/0655; F16K 24/04; B60K 15/03519
USPC ............... 137/601.14, 587, 630, 495, 601.21, 137/599.11, 599.18, 630.14, 630.15; 123/516, 519; 251/129.15, 77
See application file for complete search history.

(56) References Cited

U.S. PATENT DOCUMENTS 4,227,674 A    10/1980    Grant, Jr.
4,231,542 A    11/1980    Grenier
(Continued)

FOREIGN PATENT DOCUMENTS

EP    0713036 A1    5/1996
EP    2071217 A1    6/2009
(Continued)

OTHER PUBLICATIONS

Yojiro Iriyama, Masahide Kobayashi, Takuji Matsubara, Yuusaku Nishimura, Ryosuke Nomura, and Takashi Ishikawa, "Design of a Fuel Vapor-containment System (FVS) to Meet Zero Evaporative Emissions Requirements in a Hybrid Electric Vehicle", SAE international, 2005-01-3825.

(Continued)

*Primary Examiner* — Atif Chaudry
(74) *Attorney, Agent, or Firm* — Mei & Mark LLP

(57) ABSTRACT

A valve assembly is disclosed for controlling fluid flow between two reservoirs. The valve assembly includes a relief valve arranged inside the housing and configured to open a first fluid flow path when the first reservoir is above a first predetermined pressure value.

20 Claims, 6 Drawing Sheets

(51) Int. Cl.

| | | |
|---|---|---|
| *F16K 15/18* | (2006.01) | |
| *F16K 1/44* | (2006.01) | |
| *F02M 25/08* | (2006.01) | |
| *B60K 15/035* | (2006.01) | |
| *F16K 17/04* | (2006.01) | |
| *F16K 31/06* | (2006.01) | |
| *F16K 31/02* | (2006.01) | |
| *B60K 15/03* | (2006.01) | |

(52) U.S. Cl.
 CPC ......... *F16K31/0655* (2013.01); *F16K 31/0689* (2013.01); *F16K 31/02* (2013.01); *B60K 2015/03302* (2013.01); *B60K 2015/03514* (2013.01); *F02M 2025/0845* (2013.01)
 USPC ............ 137/599.11; 137/599.18; 137/630.19; 137/630.22; 123/516; 123/519; 251/129.15; 251/77

(56) References Cited

U.S. PATENT DOCUMENTS

| | | | |
|---|---|---|---|
| 4,364,305 | A | 12/1982 | Dalibout et al. |
| 4,370,983 | A | 2/1983 | Lichtenstein |
| 4,685,156 | A | 8/1987 | Brabazon |
| 4,865,078 | A | 9/1989 | Ensign |
| D314,229 | S | 1/1991 | Nestich |
| 5,048,790 | A | 9/1991 | Wells |
| 5,083,546 | A * | 1/1992 | Detweiler et al. ............ 123/520 |
| 5,211,151 | A * | 5/1993 | Nakajima et al. ............ 123/520 |
| 5,218,995 | A | 6/1993 | Lee |
| 5,406,975 | A | 4/1995 | Nakamichi et al. |
| 5,605,177 | A | 2/1997 | Ohashi et al. |
| 5,967,183 | A | 10/1999 | Detweiler et al. |
| 5,996,603 | A | 12/1999 | Dupler |
| 6,526,951 | B2 | 3/2003 | Ishigaki et al. |
| D502,762 | S | 3/2005 | Kriegshauser |
| 7,152,587 | B2 | 12/2006 | Suzuki |
| 7,267,113 | B2 | 9/2007 | Tsuge et al. |
| 7,270,310 | B2 | 9/2007 | Takakura |
| 7,347,192 | B2 | 3/2008 | Perry et al. |
| 7,422,193 | B2 | 9/2008 | Sisk et al. |
| 7,448,367 | B1 | 11/2008 | Reddy et al. |
| D585,959 | S | 2/2009 | Caron et al. |
| 7,591,281 | B2 | 9/2009 | Tsuge |
| D621,003 | S | 8/2010 | Gramegna et al. |
| 7,828,265 | B2 * | 11/2010 | Sisk et al. ................. 251/129.19 |
| D686,699 | S | 7/2013 | Evans et al. |
| 8,573,255 | B2 * | 11/2013 | Pifer et al. ............... 137/599.11 |
| 8,584,704 | B2 | 11/2013 | Pifer et al. |
| D706,389 | S | 6/2014 | McLauchlan et al. |
| D706,390 | S | 6/2014 | McLauchlan et al. |
| 2001/0017160 | A1 | 8/2001 | Ishigaki et al. |
| 2005/0181647 | A1 * | 8/2005 | Dehnen et al. ................. 439/134 |
| 2005/0217734 | A1 | 10/2005 | Takakura |
| 2006/0207663 | A1 * | 9/2006 | Tsuge ........................ 137/495 |
| 2008/0042086 | A1 | 2/2008 | Sisk et al. |
| 2010/0269921 | A1 | 10/2010 | Pifer et al. |
| 2011/0240145 | A1 | 10/2011 | Pifer |

FOREIGN PATENT DOCUMENTS

| | | |
|---|---|---|
| JP | S593071 U | 1/1984 |
| JP | H01173579 U | 12/1989 |
| JP | H04105959 U | 9/1992 |
| JP | H0669544 U | 9/1994 |
| JP | H0771335 A | 3/1995 |
| JP | 2001099015 A | 4/2001 |
| JP | 2006258135 A | 9/2006 |
| JP | 2008513651 A | 5/2008 |
| WO | 0190611 A2 | 11/2001 |
| WO | 2006029537 | 3/2006 |

OTHER PUBLICATIONS

PCT Search Report dated 6 Jul. 2012 for PCT application No. PCT/US2012/021876 filed Jan. 19, 2012.

European Patent Office, International Search Report issued in corresponding International Application No. PCT/IB2012/000079. Date of Mailing: Jul. 26, 2012.

\* cited by examiner

VALVE ASSEMBLY FOR HIGH-PRESSURE FLUID RESERVOIR

CROSS-REFERENCE TO RELATED APPLICATION(S)

This application is a Continuation of the U.S. Utility application Ser. No. 13/011,676, filed Jan. 21, 2011, which is a Continuation In Part of U.S. Utility application Ser. No. 12/749,924, filed Mar. 30, 2010, which claims the benefit of U.S. Provisional Application Ser. No. 61/171,548, filed Apr. 22, 2009, the disclosure of which is hereby incorporated by reference in its entirety.

TECHNICAL FIELD

The present invention relates to a valve assembly for controlling fluid flow to and from a high-pressure reservoir.

BACKGROUND

Valves are employed in a multitude of industries to control flow of liquids and/or gases. One application for such control valves appears in vehicles with stored fuel to control a vehicle's evaporative emissions resulting from gasoline vapors escaping from the vehicle's fuel system. Evaporative emissions of modern vehicles are strictly regulated in many countries. To prevent fuel vapors from venting directly to the atmosphere, a majority of vehicles manufactured since the 1970's include specifically designed evaporative emissions systems. Additionally, in recent years vehicle manufacturers began developing fully sealed fuel delivery to their engines.

In a typical evaporative emissions system, vented vapors from the fuel system are sent to a purge canister containing activated charcoal. The activated charcoal used in such canisters is a form of carbon that has been processed to make it extremely porous, creating a very large surface area available for adsorption of fuel vapors and/or chemical reactions. During certain engine operational modes, with the help of specifically designed control valves, the fuel vapors are adsorbed within the canister. Subsequently, during other engine operational modes, and with the help of additional control valves, fresh air is drawn through the canister, pulling the fuel vapor into the engine where it is burned.

SUMMARY

An embodiment of the invention is a valve assembly for controlling fluid flow between a first reservoir and a second reservoir. The valve assembly includes a valve housing and a relief valve arranged inside the valve housing and configured to open a first fluid flow path when the first reservoir is above a first predetermined pressure value. The valve assembly also includes a solenoid assembly arranged inside the valve housing and configured to open a second fluid flow path when a rate of the fluid flow from the first reservoir to the second reservoir is above a predetermined reference value.

The valve assembly additionally includes a flow restrictor arranged inside the valve housing and configured to open a third fluid flow path when the rate of the fluid flow from the first reservoir to the second reservoir is below the predetermined reference value, and when the pressure inside the first reservoir is below a second predetermined pressure value. The solenoid assembly includes an armature configured to selectively open and close the flow restrictor and the armature includes a piston and a plunger. The piston is connected to the plunger by a catch mechanism that is arranged inside the valve housing and configured to permit the plunger to translate away from the flow restrictor such that the third fluid flow path is opened without displacing the piston.

The above features and advantages and other features and advantages of the present invention are readily apparent from the following detailed description of the best modes for carrying out the invention when taken in connection with the accompanying drawings.

DETAILED DESCRIPTION

Figure 1:
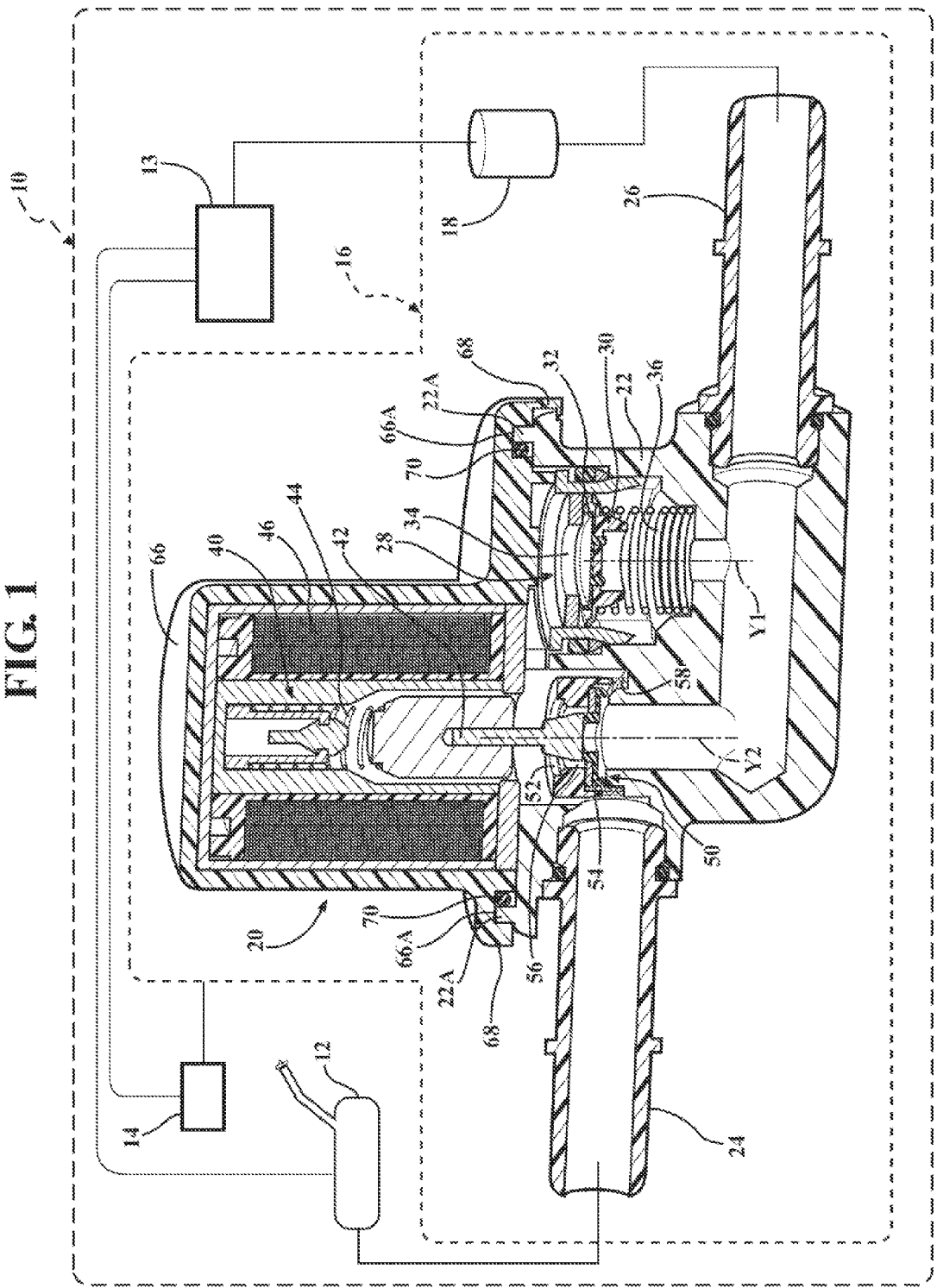
FIG. 1 is a schematic cross-sectional view of a valve assembly configured for controlling fuel vapor flow between a fuel tank and a purge canister, with the valve shown in a closed state, according to one embodiment of the invention.

Referring to the drawings wherein like reference numbers correspond to like or similar components throughout the several figures, FIG. 1 illustrates a vehicle, schematically represented by numeral 10. Vehicle 10 includes a fuel tank 12 configured as a reservoir for holding fuel to be supplied to an internal combustion engine 13 via a fuel delivery system which typically includes a fuel pump (not shown), as understood by those skilled in the art. Vehicle 10 may also include a controller 14 that is configured to regulate the operation of engine 13 and its fuel delivery system. Fuel tank 12 is operatively connected to an evaporative emissions control system 16 that includes a purge canister 18 adapted to collect fuel vapor emitted by the fuel tank 12 and to subsequently release the fuel vapor to engine 13. Controller 14 is also configured to regulate the operation of evaporative emissions control system 16 in order to recapture and recycle the emitted fuel vapor. In addition, controller 14 is adapted to regulate the operation of valve assembly 20, i.e., to selectively open and close the valve, in order to provide over-pressure and vacuum relief for the fuel tank 12

Evaporative emissions control system 16 includes a valve assembly 20. Valve assembly 20 is configured to control a flow of fuel vapor between the fuel tank 12 and the purge canister 18. Although valve assembly 20 as shown is located between fuel tank 12 and purge canister 18, nothing precludes locating the valve assembly in a different position, such as between the purge canister 18 and the engine 13. Valve assembly 20 includes a housing 22, which retains all internal components of the valve assembly in a compact manner. Housing 22 connects to fuel tank 12 via a connector 24, and to the purge canister via a connector 26. Housing 22 accommodates a relief valve 28. Relief valve 28 includes a piston 30, which may be formed from a suitable chemically-resistant material such as an appropriate plastic or aluminum. Relief valve 28 may also include a compliant seal 32, which may be formed from a suitable chemically-resistant elastomeric material. Seal 32 may be an inward-sloped dynamic pressure seal, i.e., such that the seal's outer edge or lip is angled toward a central axis Y1. In operation, seal 32 makes initial contact with the housing 22 along the seal's angled outer edge. After the initial contact with housing 22, the outer edge of seal 32 deflects to conform to the housing and hermetically closes a passage 34. The inward slope of the seal's outer edge provides enhanced control of fuel vapor flow at small openings between seal 32 and housing 22.

Figure 2:
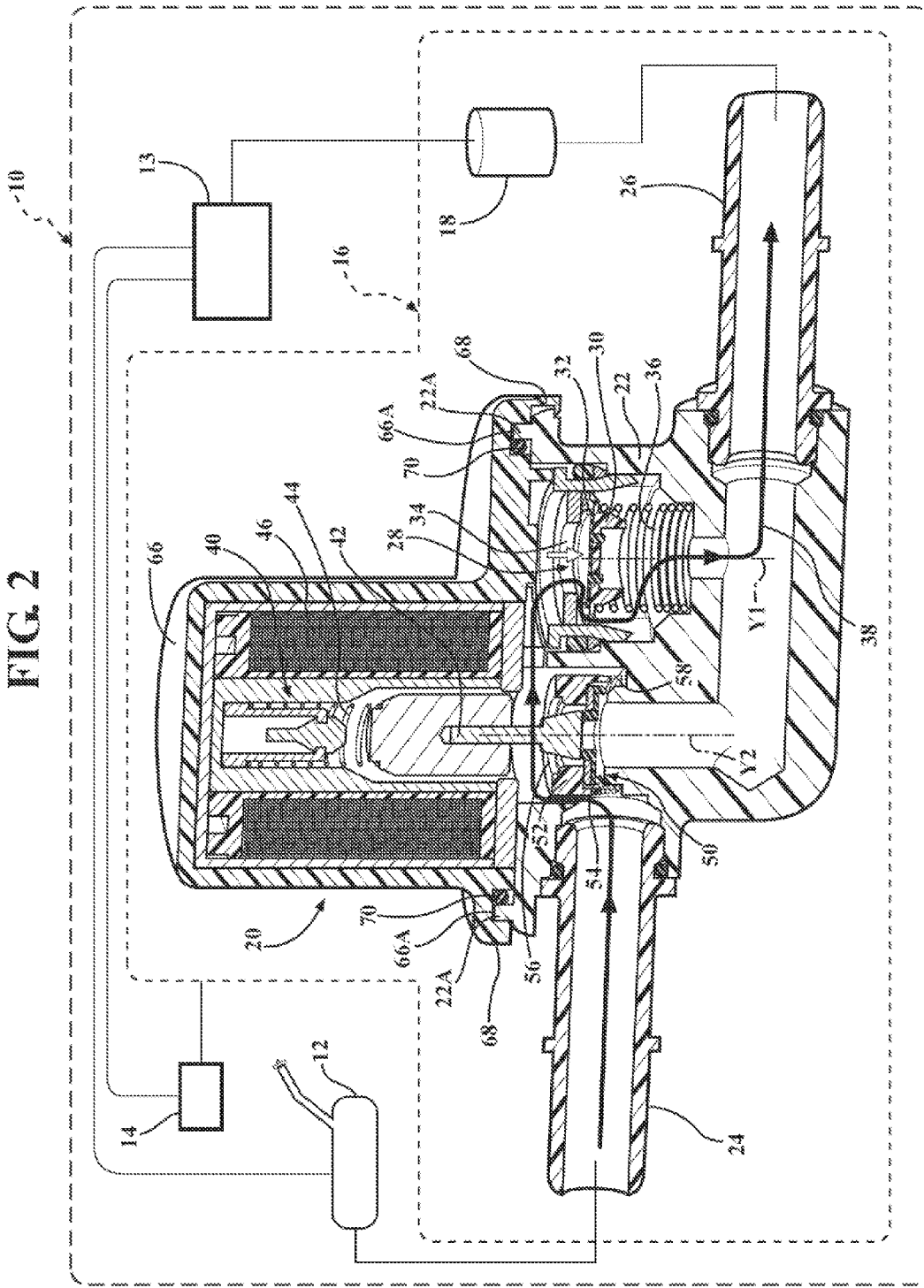
FIG. 2 is a schematic cross-sectional view of the valve assembly shown in FIG. 1, with a first flow path between the fuel tank and the purge canister shown in an open state.

Piston 30 and seal 32 may be combined into a unitary piston assembly via an appropriate manufacturing process such as overmolding, as understood by those skilled in the art. Piston 30 and seal 32 are urged to close passage 34 by a spring 36. As shown in FIG. 2, relief valve 28 is configured to facilitate opening a first fuel vapor flow path being traversed by the fuel vapor flowing in a direction from the fuel tank 12 toward the purge canister 18, represented by an arrow 38, when the fuel tank 12 is above a first predetermined pressure value. The first predetermined pressure value is preferably a positive number, representing an extreme or over-pressure condition of fuel tank 12.

The over-pressure condition of fuel tank 12 may depend on design parameters typically specified according to appropriate engineering standards and commonly includes a factor of safety to preclude operational failure of the fuel tank. Pressure in the fuel tank 12 may vary in response to a number of factors, such as the amount and temperature of the fuel contained therein. The first predetermined pressure value may be established based on the design parameters of the fuel tank 12 and of the engine's fuel delivery system, as well as based on empirical data acquired during testing and development.

Valve assembly 20 also includes a solenoid assembly 40 arranged inside housing 22, and adapted to receive electrical power from a vehicle alternator or from an energy-storage device (not shown), and be triggered or energized by a control signal from controller 14. Solenoid assembly 40 includes an armature 42, a solenoid spring 44, and a coil 46, as understood by those skilled in the art. Solenoid spring 44 is configured to generate a force sufficient to urge armature 42 out of the solenoid assembly 40, when the solenoid assembly is not energized. Coil 46 is configured to energize solenoid assembly 40, and to withdraw armature 42 into the solenoid assembly by overcoming the biasing force of spring 44.

Valve assembly 20 additionally may include a flow restrictor 50. Flow restrictor 50 is arranged inside the housing 22, and includes a piston 52 which may be formed from a suitable chemically-resistant material such as an appropriate plastic or aluminum. Flow restrictor 50 also includes a compliant seal 54, which may be formed from a suitable chemically-resistant rubber. Seal 54 is an inward-sloped dynamic pressure seal, i.e., such that the seal's outer edge or lip is angled toward a central axis Y2. In operation, seal 54 makes initial contact with the housing 22 along the seal's angled outer edge. After the initial contact with housing 22, the outer edge of seal 54 deflects to conform to the housing and to hermetically close a passage 56. The inward slope of the seal's outer edge provides enhanced control of fuel vapor flow at small openings between seal 54 and housing 22.

Similar to the piston 30 and seal 32 above, piston 52 and seal 54 may be combined into a unitary piston assembly via an appropriate manufacturing process such as overmolding. Piston 52 and seal 54 are urged to close passage 56 by the action of a spring 58. In the embodiment shown in FIG. 1, flow restrictor 50 is configured to be normally closed via the extension of armature 42 under the urging of solenoid spring 44 in the absence of the control signal from controller 14. Referring back to FIG. 2, the normally closed position of the flow restrictor, combined with the opening of relief valve 28 (as described above), also facilitates the opening of the first flow fuel vapor flow path represented by arrow 38.

Figure 3:
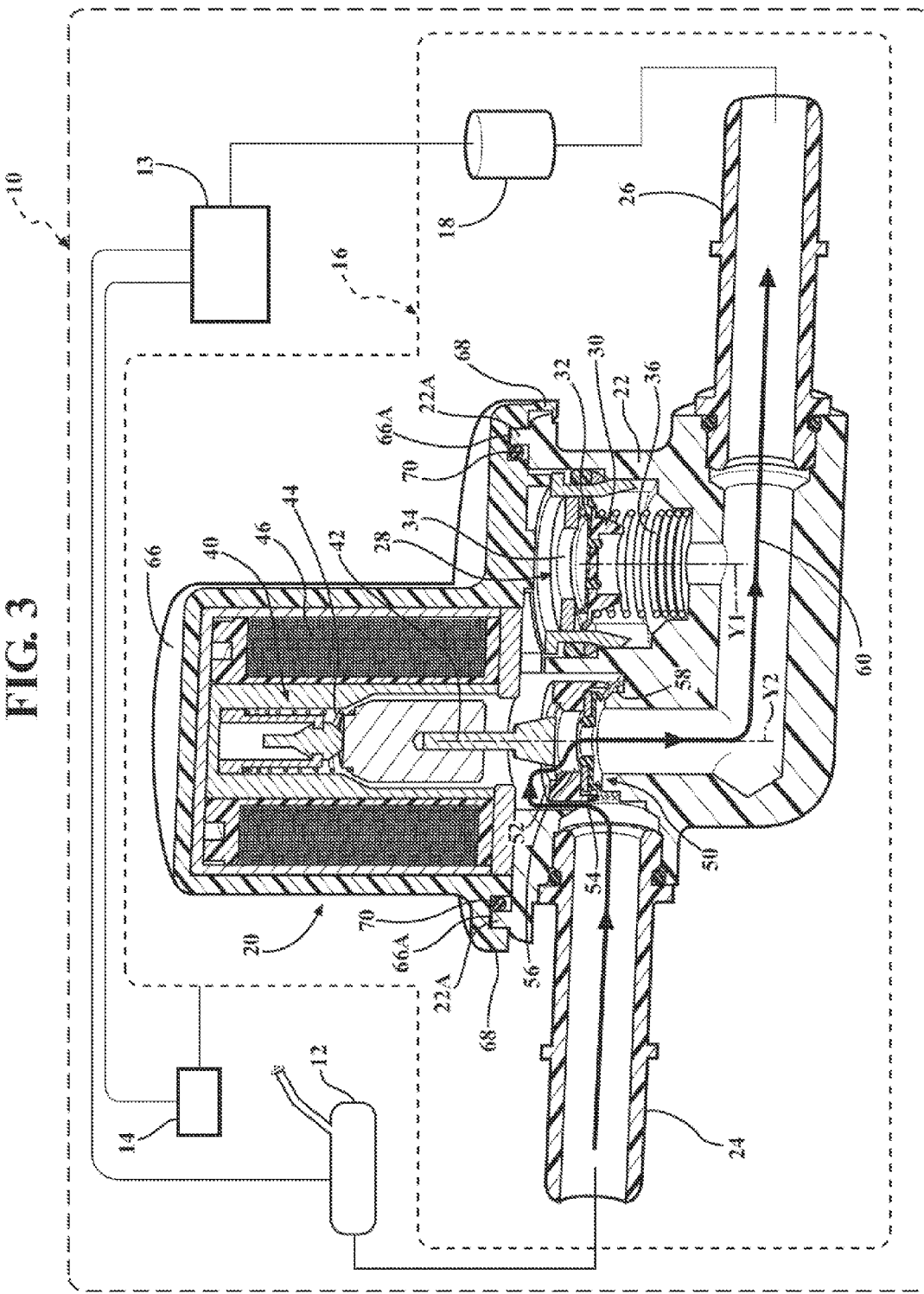
FIG. 3 is a schematic cross-sectional view of the valve assembly shown in FIG. 1, with a second flow path between the fuel tank and the purge canister shown in an open state.

As shown in FIG. 3, passage 56 is exposed when armature 42 is withdrawn into solenoid assembly 40 in response to the solenoid assembly being energized by the control signal from controller 14. Spring 58 is compressed by the force of the flow of fuel vapor, and the flow restrictor 50 is pushed out of the way by the vapor flow to thereby facilitate the opening of passage 56. Exposing passage 56 opens a second fuel vapor flow path to be traversed by the fuel vapor flowing in the direction from the fuel tank 12 toward the purge canister 18, represented by arrow 60. Fuel vapor flows in the direction represented by arrow 60 when a rate of fluid flow from fuel tank 12 to purge canister 18 is greater than a predetermined reference value in order to open passage 56.

The rate of fluid flow from fuel tank 12 may vary in response to a number of factors, such as the amount, temperature and pressure of the fuel contained therein. The predetermined reference value of the rate of fluid flow may be set at, for example, approximately 260 liters per minute (LPM), but may also be established in relation to a higher or a lower predetermined reference value. The reference value is typically predetermined or established in accordance with operating parameters of a particular engine's fuel delivery system, as understood by those skilled in the art. The predetermined rate of fluid flow, however, must be sufficiently high to compress spring 58 and thereby expose passage 56, and the rate of spring 58 should therefore be selected accordingly.

Figure 4:
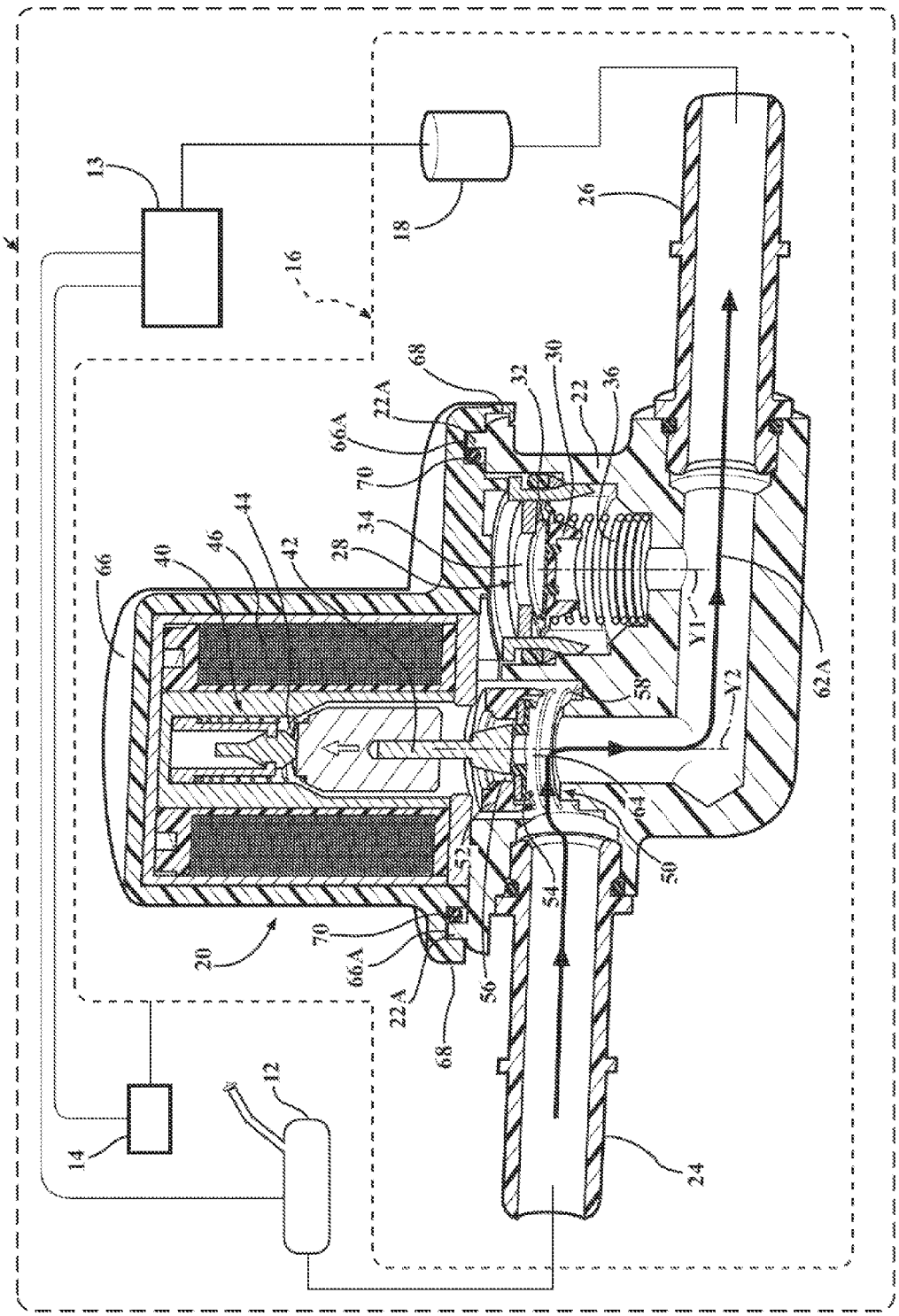
FIG. 4 is a schematic cross-sectional view of the valve assembly shown in FIG. 1, with a third flow path between the fuel tank and the purge canister shown in an open state when the fuel tank is under pressure.
Figure 5:
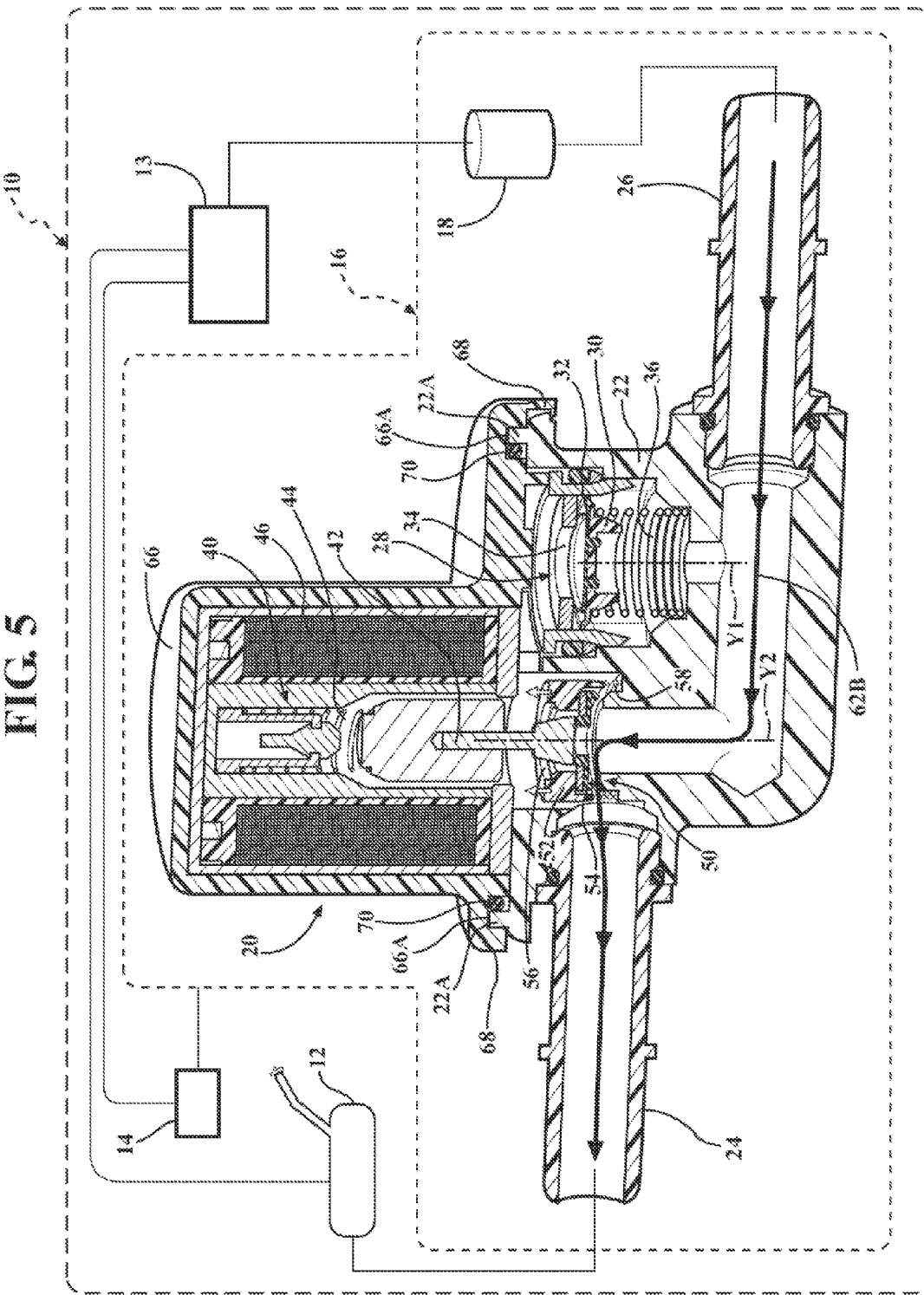
FIG. 5 is a schematic cross-sectional view of the valve assembly shown in FIG. 1, with a third flow path between the fuel tank and the purge canister shown in an open state when the fuel tank is under vacuum.
Figure 6:
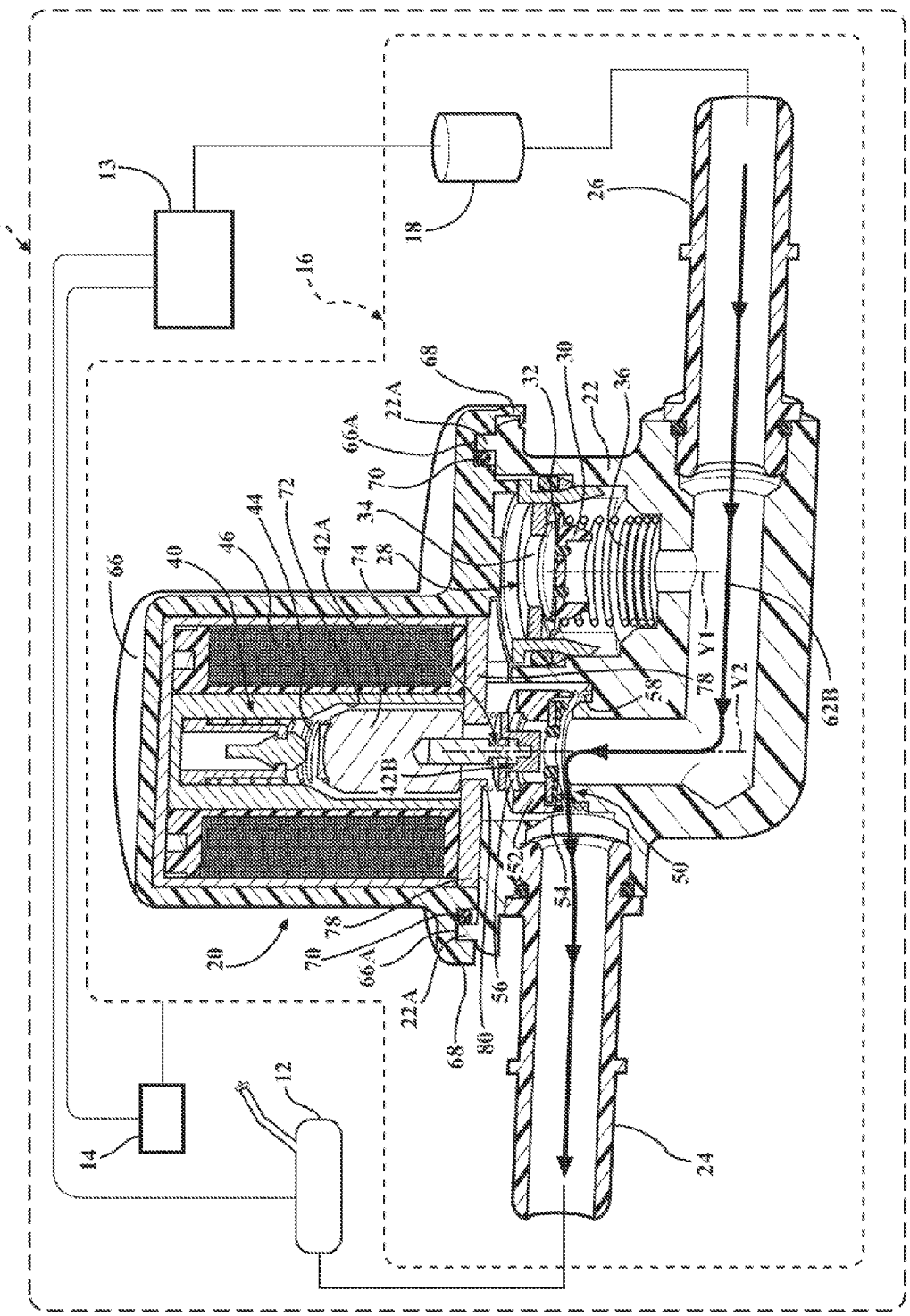
FIG. 6 is a schematic cross-sectional view of the valve assembly having an armature that includes a separate piston and plunger, and the plunger is connected to the piston via a catch mechanism.

Piston 52 and seal 54 are urged to close passage 56 by a spring 58. Flow restrictor 50 is configured to open a third fuel vapor flow path represented by arrow 62A, as shown in FIG. 4, and arrow 62B, as shown in FIG. 5. Arrow 62A represents the third fuel vapor flow path being traversed by the fuel vapor flowing in the direction from the fuel tank 12 toward the purge canister 18, and arrow 62B represents the third fuel vapor flow path being traversed by the fuel vapor flowing in a direction from the purge canister 18 toward the fuel tank 12. Fuel vapor flows in the direction represented by arrow 62B when the rate of the fluid flow from fuel tank 12 to purge canister 18 is below the first predetermined reference value As shown in FIG. 6, armature 42 may also be composed of separate parts, a piston 42A and a plunger 42B in order to reduce operational hysteresis of the armature during the opening and closing of the passage 56. Friction may develop between the armature 42 and a bore 72 of the solenoid assembly 40 during the operation of the valve assembly 20. Particularly, such friction may impact the opening and closing instance of the third fuel vapor flow path represented by arrow 62B shown in FIG. 5 as the flow restrictor 50 is pushed out of the way by the vapor flow. In order to address such a possibility, as shown in FIG. 6, the plunger 42B is connected to the piston 42A via a catch mechanism 74. Accordingly, the catch mechanism 74 is configured to maintain the connection between the plunger 42B and the piston 42A.

The catch mechanism 74 is configured to permit the plunger 42B to move or translate away from the flow restrictor 50 for a distance 76 that is sufficient to open the third fuel vapor flow path 62B without the need for the piston 42A to also be displaced away from the flow restrictor. Therefore, the separate piston 42A and plunger 42B permit friction between the piston 42A and the bore 72 to not impact the initial opening of the third fuel vapor flow path 62B. A stop plate 78 is provided to limit travel of the piston 42A within the bore 72.

As shown in the embodiment of FIG. 6, a plunger spring 80 is additionally provided to preload the plunger 42B against the stop plate 78. The plunger spring 80 is configured to press plunger 42B against seal 54 and maintain the normally closed position of the flow restrictor 50 when solenoid assembly 40 is not energized. The plunger spring 80 permits the force of gravity to be employed in pulling the piston 42A against the stop plate 78 when the valve assembly 20 is oriented as shown in FIG. 106. Accordingly, in the situation when the valve assembly 20 is oriented to employ the force of gravity in such manner, the solenoid spring 44 becomes optional. In such a case, the plunger spring 80 is additionally configured to perform all the described functions of the solenoid spring 44.

As shown in FIG. 4, passage 64 is exposed when armature 42 is withdrawn into solenoid assembly 40 in response to the solenoid assembly being energized by the control signal from controller 14. The force of the flow of fuel vapor in the third fuel vapor flow path 62A is insufficient to compress spring 58. Spring 58 is thus permitted to extend and urge the flow restrictor 50 to close passage 56 while at the same time exposing passage 64. In this example, the third fuel vapor flow path represented by arrow 62A is opened when the rate of fluid flow is lower than the predetermined reference value of approximately 260 LPM, but may also be established in relation to a higher or a lower reference value. However, to expose passage 64, the rate of fluid flow in the third fuel vapor flow path should be incapable of compressing spring 58; therefore, the rate of spring 58 should be selected accordingly.

As noted above, flow restrictor 50 is additionally configured to open the third fuel vapor flow path being traversed by the fuel vapor flowing in the direction represented by arrow 62B when the fuel tank 12 is below a second predetermined pressure value (shown in FIG. 5). The first predetermined pressure value is greater than the second predetermined pressure value. While the first predetermined pressure value is preferably a positive number, representing an extreme or over-pressure condition of fuel tank 12, the second predetermined pressure value is preferably a negative number i.e., signifying that the fuel tank 12 is under a vacuum. This vacuum in the fuel tank 12 is sufficient to overcome the force of spring 44, and thereby expose passage 64 to open the third fuel vapor flow path. Spring 44 is specifically designed to permit opening of the third fuel vapor flow path at a specific vacuum set point of the fuel tank 12. As such, the rate of solenoid spring 44 generates a force that is sufficient to close passage 64 when the fuel tank 12 is at positive pressure, but is insufficient to close the same passage when the fuel tank is under vacuum.

In the embodiments shown in FIGS. 1 through 5, valve assembly 20 also includes a cover 66, which in this example is configured as a single-piece component. Cover 66 locates relative to the housing 22 with the aid of a flange 22A nesting inside a channel 66A. Cover 66 engages and interconnects with housing 22 via tabbed extensions 68 that are configured to provide a snap-fit against the housing. Valve assembly 20 additionally includes a static seal 70 adapted to hermetically seal cover 66 against housing 22. As shown in FIGS. 1-5, and as understood by those skilled in the art, seal 70 is of an O-ring type.

While the best modes for carrying out the invention have been described in detail, those familiar with the art to which this invention relates will recognize various alternative designs and embodiments for practicing the invention within the scope of the appended claims.

The invention claimed is:

1. A valve assembly configured for controlling fluid flow between a first reservoir and a second reservoir, each reservoir being arranged externally with respect to the valve assembly, the valve assembly comprising:
   a valve housing;
   a relief valve arranged inside the valve housing and configured to open a first fluid flow path inside the valve housing when a pressure inside the first reservoir is above a first predetermined pressure value;
   a solenoid assembly arranged inside the valve housing and configured to open a second fluid flow path inside the valve housing when a rate of the fluid flow from the first reservoir to the second reservoir is above a predetermined reference value;
   a flow restrictor arranged inside the valve housing and configured to open a third fluid flow path inside the valve housing when the rate of the fluid flow from the first reservoir to the second reservoir is below the predetermined reference value, and when the pressure inside the first reservoir is below a second predetermined pressure value;
   a stop plate configured to limit travel of the piston toward the flow restrictor; and
   a catch mechanism arranged inside the valve housing and operatively connected to the solenoid assembly;
   wherein:
      the solenoid assembly includes an armature configured to selectively open and close the flow restrictor;
      the armature includes a piston and a plunger; and
      the catch mechanism connects the piston to the plunger and is configured to permit the plunger to translate away from the flow restrictor such that the third fluid flow path is opened without displacing the piston.

2. The valve assembly according to claim 1, wherein the first predetermined pressure value is greater than the second predetermined pressure value.

3. The valve assembly of claim 1, further comprising a plunger spring configured to preload the plunger against the stop plate and press the plunger against the flow restrictor to maintain the flow restrictor in a closed position, and a coil configured to energize the armature and overcome the plunger spring to open the flow restrictor.

4. The valve assembly of claim 3, further comprising a solenoid spring configured to generate a force sufficient to close the restrictor by displacing the armature, wherein the coil is additionally configured to overcome the solenoid spring.

5. The valve assembly according to claim 3, wherein the coil is configured to overcome the plunger spring when the rate of the fluid flow is below the predetermined reference value.

6. The valve assembly according to claim 3, wherein the plunger spring is configured to generate a force sufficient to close the third fluid flow path when the pressure inside the first reservoir is a positive value, but insufficient to close the third fluid flow path when the pressure inside the first reservoir is a negative value.

7. The valve assembly according to claim 1, wherein the flow restrictor is configured to be normally closed, the valve assembly further comprising a spring configured to urge the flow restrictor to open.

8. The valve assembly according to claim 1, wherein at least one of the relief valve and the flow restrictor includes an inward-sloped pressure seal configured to seal the corresponding relief valve and the flow restrictor against the housing.

9. The valve assembly according to claim 1, further comprising a cover configured to retain the relief valve, the flow restrictor, and the solenoid assembly inside the housing.

10. The valve assembly according to claim 9, wherein the cover engages and interconnects with the housing via a snap-fit.

11. The valve assembly according to claim 9, further comprising a static seal configured to seal the cover against the housing.

12. The valve assembly according to claim 11, wherein the static seal is an O-ring type seal.

13. The valve assembly according to claim 1, wherein the valve housing comprises a first recess for receiving the flow restrictor and a second recess for receiving the relief valve, wherein the valve assembly further comprises a static seal surrounding the first recess and the second recess, and wherein the first recess and the second recess are fluidly connected to form a portion of the first fluid flow path.

14. An evaporative emissions control system comprising:
a controller;
a first reservoir;
a second reservoir; and
a valve assembly configured to control fluid flow between the first reservoir and the second reservoir, wherein each reservoir is arranged externally with respect to the valve assembly, the valve assembly including:
a valve housing;
a relief valve arranged inside the valve housing and configured to open a first fluid flow path inside the valve housing when a pressure inside the first reservoir is above a first predetermined pressure value;
a solenoid assembly regulated by the controller, arranged inside the valve housing, and configured to open a second fluid flow path inside the valve housing when a rate of the fluid flow from the first reservoir to the second reservoir is above a predetermined reference value;
a flow restrictor arranged inside the valve housing and configured to open a third fluid flow path inside the valve housing when the rate of the fluid flow from the first reservoir to the second reservoir is below the predetermined reference value, and when the pressure inside the first reservoir is below a second predetermined pressure value;
a catch mechanism arranged inside the valve housing and operatively connected to the solenoid assembly; and
a stop plate arranged inside the valve housing;
wherein:
the solenoid assembly includes an armature configured to selectively open and close the flow restrictor, and the armature includes a piston and a plunger;
the catch mechanism connects the piston to the plunger and is configured to permit the plunger to translate away from the flow restrictor such that the third fluid flow path is opened without displacing the piston; and
the stop plate is configured to limit travel of the piston toward the flow restrictor.

15. The evaporative emissions control system according to claim 14, wherein the first predetermined pressure value is greater than the second predetermined pressure value.

16. The evaporative emissions control system of claim 14, further comprising a plunger spring configured to preload the plunger against the stop plate and press the plunger against the flow restrictor to maintain the flow restrictor in a closed position, and a coil configured to energize the armature and overcome the plunger spring to open the flow restrictor.

17. The evaporative emissions control system of claim 16, further comprising a solenoid spring configured to generate a force sufficient to close the restrictor by displacing the armature, wherein the coil is additionally configured to overcome the solenoid spring.

18. The evaporative emissions control system according to claim 17, wherein the coil is configured to overcome the plunger spring when the rate of the fluid flow is below the predetermined reference value.

19. The evaporative emissions control system according to claim 17, wherein the plunger spring is configured to generate a force sufficient to close the third fluid flow path when the pressure inside the first reservoir is a positive value, but insufficient to close the third fluid flow path when the pressure inside the first reservoir is a negative value.

20. The evaporative emissions control system according to claim 14, wherein the flow restrictor is configured to be normally closed, the valve assembly further comprising a spring configured to urge the flow restrictor to open.

\* \* \* \* \*